Aug. 15, 1961    J. ESHKANIAN    2,996,296
WINDOW OPERATING MEANS AND THE LIKE
Filed Oct. 8, 1959    2 Sheets-Sheet 1

INVENTOR.
James Eshkanian
BY
J. L. Carpenter
ATTORNEY

Aug. 15, 1961 J. ESHKANIAN 2,996,296
WINDOW OPERATING MEANS AND THE LIKE
Filed Oct. 8, 1959 2 Sheets-Sheet 2
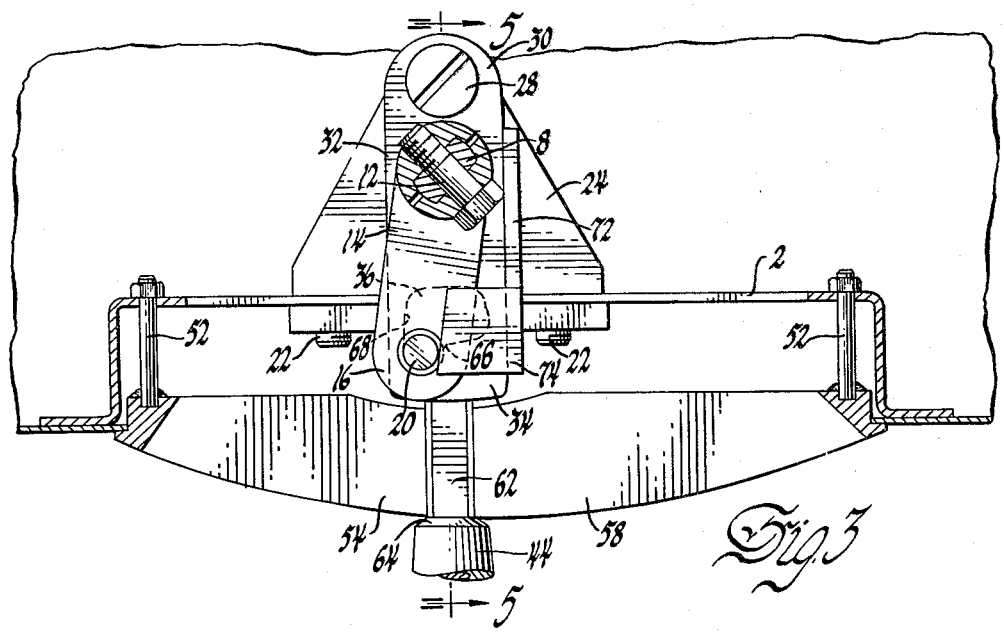
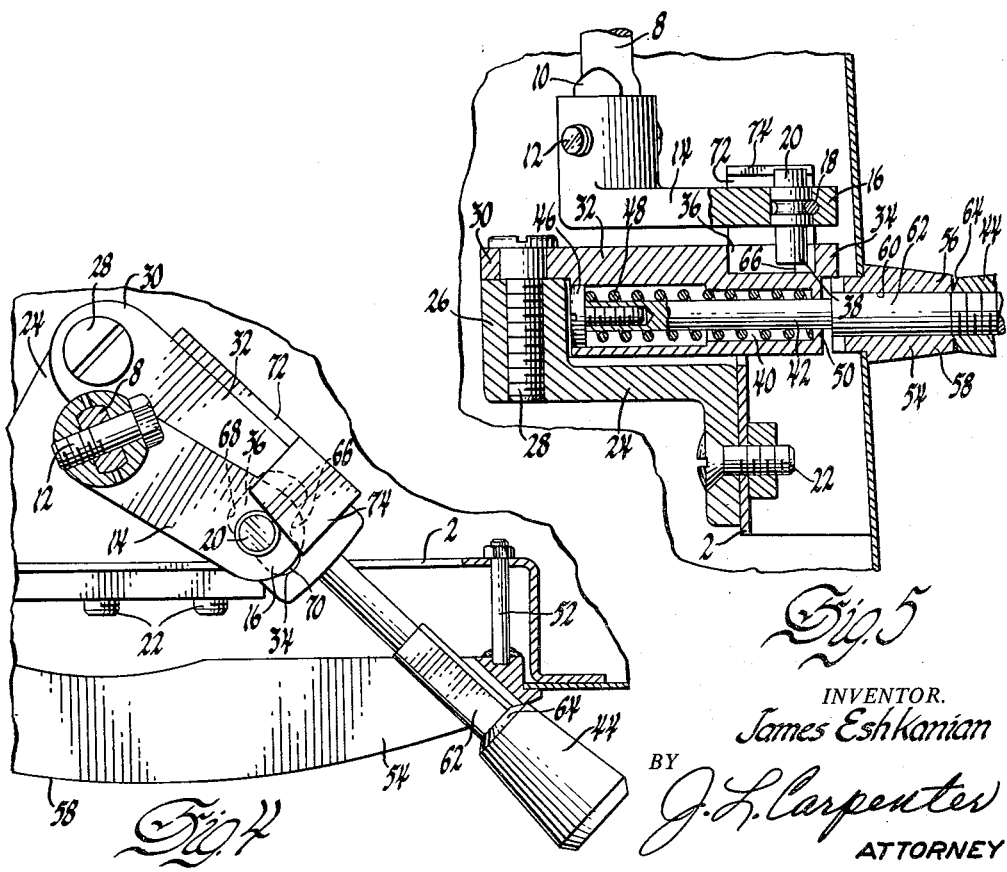
INVENTOR.
James Eshkanian
BY
J. L. Carpenter
ATTORNEY

United States Patent Office 2,996,296
Patented Aug. 15, 1961

2,996,296
WINDOW OPERATING MEANS AND THE LIKE
James Eshkanian, Livonia, Mich., assignor to General Motors Corporation, Detroit, Mich., a corporation of Delaware
Filed Oct. 8, 1959, Ser. No. 845,260
3 Claims. (Cl. 268—118)

This invention relates generally to operating means for a shaft to rotate it and lock it in a predetermined location. The invention is particularly concerned with such shafts vertically positioned which are adapted to have an automotive vehicle window connected thereto known in the art as a "CV" (controlled ventilation) window. The operating means comprising the invention is adapted to open and maintain such windows in a desired position as well as to close them and lock them in their closed position.

The CV windows of automotive vehicles, which are the small windows forward of the main windows in the front doors and rearward of the main windows in the rear doors pivoted about a substantially vertical axis, have always presented certain problems so far as operation and locking are concerned. In the past these windows have been operated by various means such as gear and crank assemblies, merely pushing them open and closed by hand, etc. The windows have been locked by bolt-type locks, by pivoted locks, or by relying on the gears of the gear and crank assemblies. The devices enumerated above have been found to be too expensive, too complicated or they fail to perform their function satisfactorily.

It is therefore a broad general object of this invention to provide a unique and extremely simple operating means for rotating a shaft.

A further object of the invention is to provide simple but positive locking means to prevent rotation of the shaft which is operated by the same means which rotates the shaft.

Another object of the invention is to provide unique operating and locking means for automotive CV windows.

For other and more specific objects of this invention and a fuller understanding thereof, reference may be made to the accompanying detailed description taken in conjunction with the drawings in which:

FIGURE 3 is a view taken substantially at the same location as that of FIGURE 2 but with the operating handle and the portions of the operating mechanism in an intermediate position.

Figure 2:
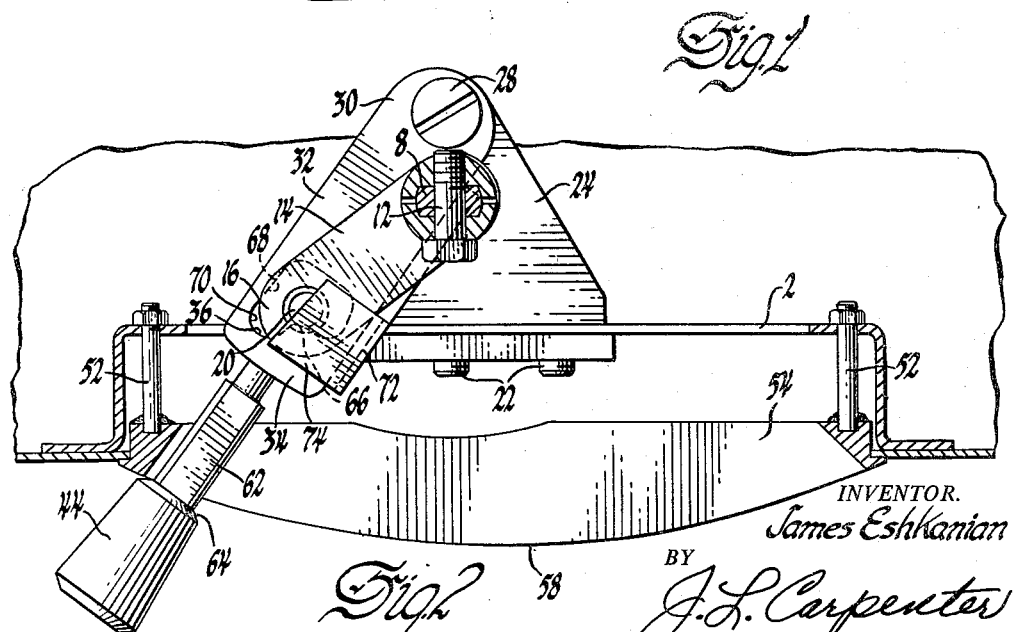
FIGURE 2 is a plan view taken substantially on the line 2—2 of FIGURE 1 again with portions broken away and in section to further illustrate details of the novel window operating mechanism.

FIGURE 4 again is a view similar to FIGURE 2 but with the operating handle in the extreme open window position.

FIGURE 5 is a view in elevation of portions broken away and in section taken substantially on the line 5—5 of FIGURE 3 and serves to illustrate certain details of the frictional means for holding the window in whatever position it is placed by the operating handle.

Referring now to the drawings, the inside right door panel 2 of an automotive vehicle is shown. Located above the panel and forming a part of the door is a small ventilator window 4 having a frame 6 to which is fixed a substantially vertically journaled shaft 8. The lower end 10 of shaft 8 has fixed thereto by the stud 12 a substantially horizontally extending arm 14 which turns about the axis of shaft 8 in a substantially horizontal plane. Secured in the free end 16 of arm 14 by a retaining ring 18 (see FIGURE 5) is a vertically extending pin 20. Fixed to panel 2 by studs 22 is an outwardly extending bracket 24. Pivotally supported at the outer end 26 of bracket 24 by stud 28 is one end 30 of a lever 32. The lever 32 pivots about stud 28 in a horizontal plane substantially parallel to and below the arm 14. The lever 32 has in its upper surface toward the free end thereof an angular slot 36 into which the lower end 38 of pin 20 extends. The lever 32 is provided with a central bore 40 into which one end 42 of an operating handle 44 extends. The end 42 is tapped and provided with a flanged stud 46 which engages one end of a helical coil spring 48. The opposite end of spring 48 abuts the flanged portion 50 of lever 32. Extending inwardly and also fixed to the inner panel 2 by studs 52 is a slotted track assembly 54 including upper and lower tracks 56 and 58 and a slot 60. A shaft portion 62 to which the handle 44 is threaded extends through slot 60 and is adapted to move back and forth therein with the end surface 64 of handle 44 being held in frictional engagement with the upper and lower track surfaces 56 and 58 by the spring 48.

Figure 1:
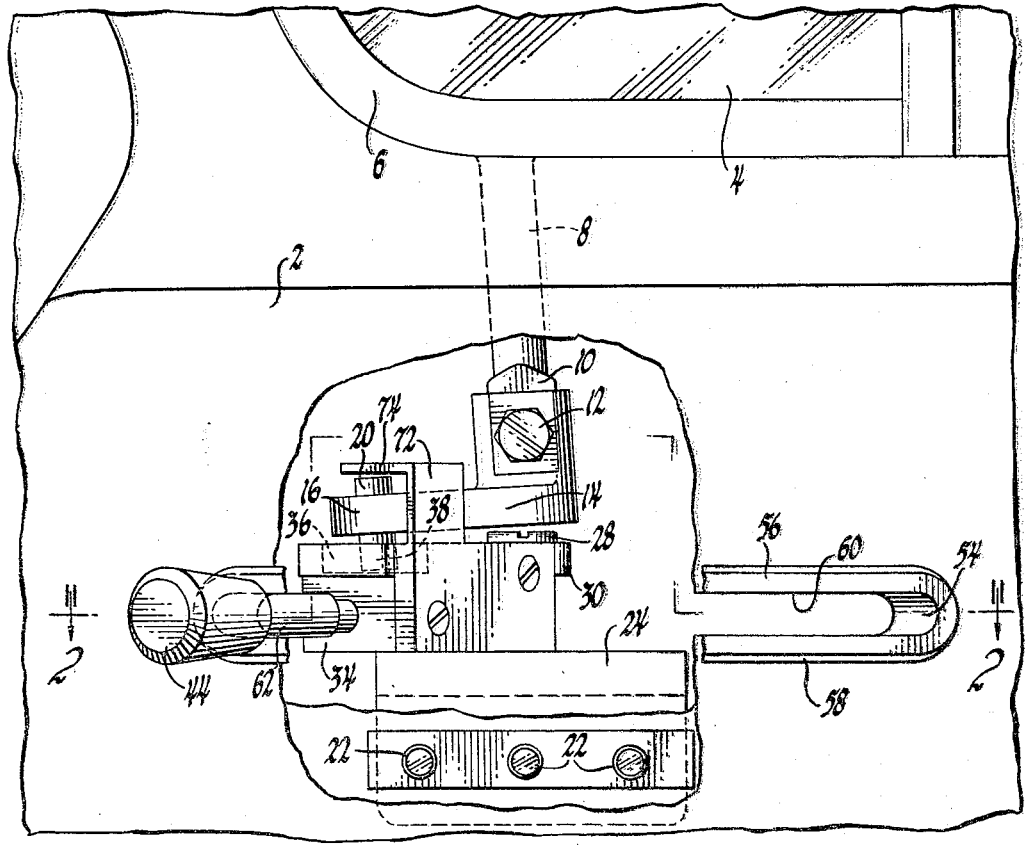
FIGURE 1 is a side view in elevation of the inside of a front right automotive vehicle door with portions broken away to illustrate the operating means for opening, closing and locking a small ventilating window known in the art as a CV window.

The operation of the window operating means is as follows: When the handle 44 is moved to the position shown in FIGURES 1 and 2 (the closing and locking position for window 4) the lower end 38 of pin 20 moves behind a shoulder 66 formed by the angular arrangement of slot 36. It will be observed that with the pin behind shoulder 66 any attempt to turn the shaft 8, as for example by pushing or pulling on the window 4, will be resisted because of the interference of shoulder 66 with movement of the pin 20 (see particularly FIGURES 1 and 2). This interference occurs because of the relative location of the axis of shaft 8 and the pivot point of lever 32 which are horizontally displaced from each other. In other words, continuing to observe FIGURE 2, it will be seen that if one attempts to turn shaft 8 and arm 14, the pin 38 will be forced into the shoulder 66. Since, however, the shoulder does not move unless lever 32 moves, the shaft 8 must remain stationary and the window will be locked in a closed position. If, however, it is desired to open the window, an operator merely grasps the operating handle 44 and moves it to the right or counterclockwise when viewing FIGURE 2. Movement of operating handle to the right will cause the shoulder 66 to move from in front of the lower end 38 of pin 20. The pin will then be picked up by the surface 68 of slot 36 and since the pin lower end 38 can then move along the surface 68 into the pocket 70 of slot 36, movement of lever 32 to the right or in a counterclockwise direction will also cause counterclockwise movement of arm 14 and consequently shaft 8. The extreme counterclockwise position of handle 44 (see FIGURE 4) is determined by the presence of a limit stop 72 secured to the lever 32. The limit stop 72 has a tab 74 extending horizontally over the top of panel 2 which is engaged by the upper end of pin 20.

As previously pointed out, the operating handle and accordingly the window 4 may be yieldingly maintained in any desired open position by the frictional forces set up between the surfaces of tracks 68 and the end surfaces of handle 44 created by the preloading of spring 48.

I claim:
1. A journaled shaft in combination with means for operating and locking it in a predetermined position comprising a lever member pivoted about an axis substantially parallel to said shaft, an arm member connected to said shaft for rotation therewith and extend- ing in a plane substantially parallel to the plane of said lever member and a pin secured to one of said members and movable in a slot in the other of said members, said slot being formed with a shoulder against which said pin is urged when said shaft is in said predetermined position to prevent rotation of said shaft except by movement of said lever member.

2. A journaled shaft in combination with means for operating and locking it in a predetermined position comprising a lever member pivoted about an axis substantially parallel to said shaft, an arm member connected to said shaft for rotation therewith and extending in a plane substantially parallel to the plane of said lever member, a pin secured to one of said members and movable in a slot in the other of said members, said slot being formed with a shoulder against which said pin is urged when said shaft is in said predetermined position to prevent rotation of said shaft except by movement of said lever member, and means for yieldingly retaining said lever member in whatever position it is placed comprising a handle connected thereto, a friction surface along which said handle is adapted to move, and spring means urging said handle against said friction surface.

3. In combination with a window fixed to a substantially vertically journaled shaft, means to maintain said window in any desired open position and close and lock said window comprising a lever pivoted about an axis substantially parallel to said shaft, an arm connected to said shaft for rotation therewith and extending in a plane substantially parallel to the plane of said lever, a pin secured to said arm and movable horizontally in a slot in said lever, said slot being formed with a shoulder behind which said pin is urged when said window is closed thereby preventing opening of said window except by force applied to said lever to move said pin from behind said shoulder, an operating handle, said lever having a bore into which said handle extends, a slotted track through which said handle extends, and biasing means operable between said handle and lever urging it into frictional engagement with said track to thereby yieldingly hold said window in whatever open position it is placed by said handle.

References Cited in the file of this patent

UNITED STATES PATENTS

| | | |
|---|---|---|
| 1,912,757 | Brump | June 6, 1933 |
| 2,930,245 | Wiggs | Mar. 29, 1960 |